United States Patent [19]

Skutch, Jr.

[11] 3,736,498
[45] May 29, 1973

[54] BATTERY TESTER

[76] Inventor: William G. Skutch, Jr., 3724 Sulphur Springs Road, Toledo, Ohio 43606

[22] Filed: Aug. 25, 1971

[21] Appl. No.: 174,866

[52] U.S. Cl..................................324/29.5, 324/51
[51] Int. Cl..........................G01n 27/42, G01n 31/02
[58] Field of Search........................324/29.5, 51, 53, 324/158 F

[56] References Cited

UNITED STATES PATENTS

| | | | |
|---|---|---|---|
| 3,395,809 | 8/1968 | Mellion | 324/29.5 |
| 2,833,984 | 5/1958 | Eickoff | 324/29.5 |
| 2,205,316 | 6/1940 | Stratton | 324/51 |

Primary Examiner—Alfred E. Smith
Attorney—Carl F. Schaffer, Allen Owen, Henry K. Leonard et al.

[57] ABSTRACT

A battery tester comprising an indicator lamp carried by an arm extending over a base which receives a battery to be tested. The arm is attached to a plunger, vertically slidable within a stem connected to the base. A bias spring urges the arm to an uppermost position on the stem. Conductive means on the base, stem, plunger and arm provide a partial circuit between the lamp and a first pole of the battery in contact with the base. Depression of the arm from its uppermost position places a protruding terminal on the lamp in contact with a second pole on the battery thereby completing a circuit between the battery and the lamp.

5 Claims, 6 Drawing Figures

PATENTED MAY 29 1973 3,736,498
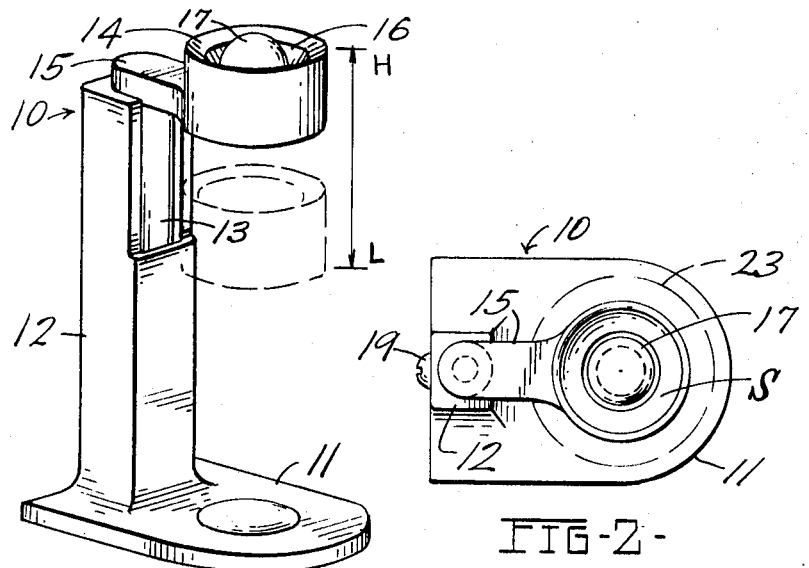
FIG-1-
FIG-2-
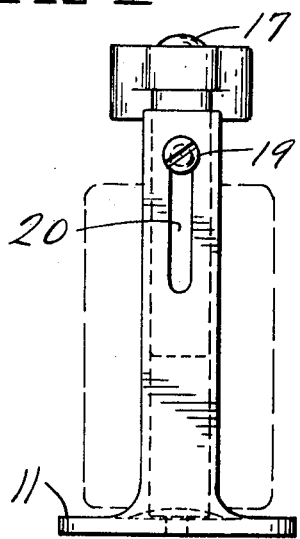
FIG-3-
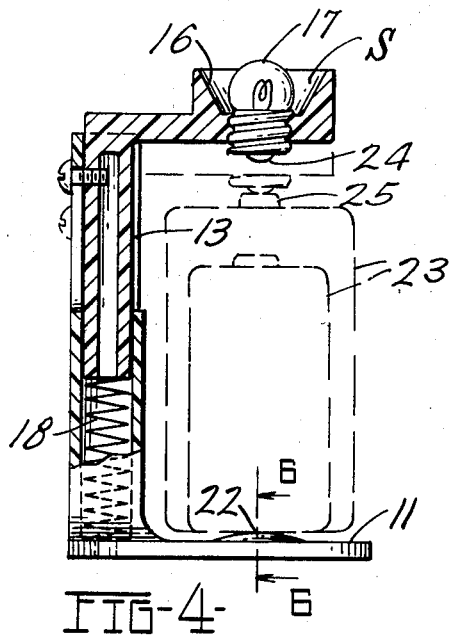
FIG-4-
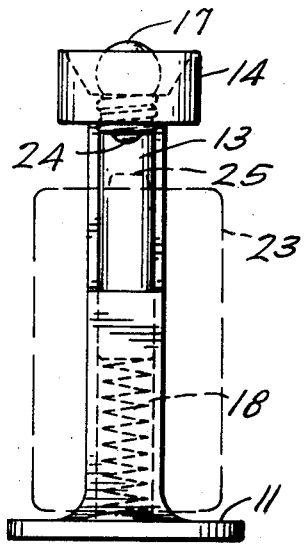
FIG-5-
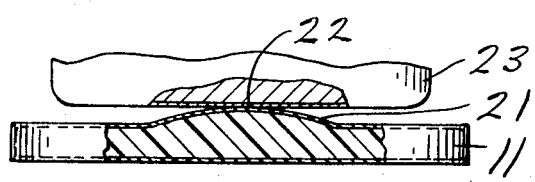
FIG-6-
INVENTOR:
WILLIAM G. SKUTCH, JR.
BY
Oden & Oden
ATT'YS.

BATTERY TESTER

BACKGROUND OF THE INVENTION

Dry cell batteries are manufactured in many different standard sizes. These batteries are commonly stored in wholesale and retain outlets for a number of weeks or months prior to sale for multiple consumer uses. Improper storage during this time can cause the batteries to lose their stored electrical energy prior to sale. Faulty construction, may also cause power loss in the batteries prior to use. Furthermore, a relatively inexpensive battery tester is useful in homes to gauge the relative remaining life of batteries which have been used for a period of time.

It has therefore been desirable to provide a simple, inexpensive battery tester for use in a retail store or a home, which will accommodate any size of commercial dry cell battery.

The present invention contemplates such a battery tester which can receive various standard sizes of batteries.

SUMMARY OF THE INVENTION

The invention is a battery tester for various sizes of dry cell batteries. The tester comprises a base having a terminal for contacting one pole of a dry cell battery. A vertical stem, connected to the base, receives a plunger in axial sliding contact therewith. A bias spring between the base and a lower end of the plunger urges the plunger to an uppermost position on the stem. A horizontal socketed arm, extending from an upper end of the plunger carries a test lamp above the terminal on the base. A contact on the test lamp, threadably attached to the horizontal arm, protrudes through the arm toward the base. Depression of the plunger from its uppermost position toward the base, carries the test lamp on the horizontal arm into electrical contact with a second pole of the battery on the base. The base, stem, plunger, and horizontal arm, include a conductive material which provides an electrical circuit between the battery and the test lamp when the lamp is depressed into contact with the battery.

BRIEF DESCRIPTION OF THE DRAWINGS

FIG. 1 is a perspective view of the battery tester of the present invention;

FIG. 2 is a plan view of the battery tester of the present invention;

FIG. 3 is a partially diagrammatic, rear view of the battery tester of the present invention;

FIG. 4 is a partially diagrammatic side view of the present invention;

FIG. 5 is a partially diagrammatic front view of the battery tester of the present invention; and FIG. 6 is a partial cross-sectional view of the base of the battery tester of the present invention taken along line 6—6 of FIG. 4.

DESCRIPTION OF THE PREFERRED EMBODIMENT

Referring to FIGS. 1-5, a battery tester 10 comprising a base 11, a stem 12 connected to or made integral with the base 11, a plunger 13 in axial sliding contact with the stem 12 and a horizontal socketed arm 14 comprising a beam member 15 and a socket member 16 for threadably receiving an indicator lamp 17 is shown. The socket member 16 defines a dish-shaped socket S which receives the indicator lamp 17 therein. The indicator lamp 17 is partially recessed within the socket S for making illumination of the lamp 17 readily visible. As shown in FIGS. 4 and 5, a bias spring 18 within the stem 12 between the base 11 and a lower end of the plunger 13 urges the plunger 13, carrying the horizontal socketed arm 14 to an uppermost position H over the base 11. As shown in FIG. 3, a guide pin 19 attached to the plunger 13 rides within a guide track 20 formed on the stem 12, thus limiting the axial travel of the plunger 13 within the stem 12 between the uppermost position H and a lowermost position L.

As shown in FIG. 6, the base 11 is provided with a raised central portion 21 for receiving and contacting a shell or outer pole 22 of a battery 23 to be tested.

As best seen in FIGS. 4 and 5, a center contact 24 of the indicator lamp 17 protrudes through the socket member 16 over the axial center of the base 11. Thus when a battery 23 is placed on the base 11 in contact with the raised portion 21, the center contact 24 of the indicator lamp 17 is axially aligned over a center or second pole 25 of the battery 23.

Depression of the horizontal socketed arm 14 carries the contact 24 into connection with the second pole 25 of the battery 23.

The components of the battery tester — the base 11, the stem 12, the plunger 13, and the horizontal socketed arm 14 — comprise any suitable conductive material or, in a preferred embodiment, a conductive coating on a plastic body whereby contact of the battery poles 22 and 25 as described creates an electrical circuit between the battery 23 and the indicator lamp 17. Completion of the circuit will cause the battery 23 to illuminate the indicator lamp 17, the intensity of the lamp being proportional to the amount of electrical energy in the battery 23.

Because the center contact 24 of the indicator lamp 17 is axially aligned over the raised portion 21 and is vertically adjustable from the uppermost position H, the battery tester 10 can receive many varying diameters and heights of batteries to be tested. Thus, large D cells, and even small AAA cells, which have the same nominal output voltage can be checked with equal facility.

What I claim is:

1. A battery tester comprising, in combination, a base, means on said base for establishing electrical contact with a first pole of a dry cell battery placed thereon, a hollow stem connected to said base having a lower end and an upper end said stem defining a receiving chamber in said lower end, a plunger positioned in said receiving chamber in axial sliding contact with said stem, a compression spring in said receiving chamber urging said plunger toward an uppermost position, a horizontal socketed arm connected to an upper end of said plunger over said base said upper end of said stem defining a guide channel for guiding the vertical travel of said horizontal arm, whereby relative horizontal motion of said arm and said stem is prevented, a test lamp on said horizontal arm and in electrical contact therewith, means on said horizontal arm for establishing electrical contact between a center contact of said test lamp and a second pole of said battery; said base, said stem, said plunger, and said horizontal arm comprising an electrically conductive material whereby downward movement of said horizontal arm, carried by said plunger, into contact with said second pole of said battery upon said base creates an electrical circuit between said battery and said lamp for testing the output of said battery.

2. The battery tester according to claim 1 further comprising a guide pin upon said plunger extending between detent means upon said stem for limiting axial travel of said plunger from said uppermost position to a lowermost position.

3. A battery tester according to claim 2 wherein said means on said base for establishing electrical contact with a first pole of a dry cell battery placed thereon comprises a convex, electrically conductive portion.

4. A battery tester according to claim 3 wherein said horizontal socketed arm comprises a conductive socket member connected to said plunger.

5. A battery tester according to claim 4 wherein said means on said horizontal arm for establishing electrical contact between said test lamp and said second pole of said battery comprises a threaded open socket member for threadably receiving said test lamp, a contact of said test lamp protruding through said socket member axially superior to said dry cell battery, whereby lowering of said horizontal arm connected to said plunger places said contact of said lamp against said second pole of said battery.

* * * * *